(No Model.) 2 Sheets—Sheet 1.
W. H. VAN VOORHIS.
POTATO DIGGER.
No. 476,763. Patented June 7, 1892.
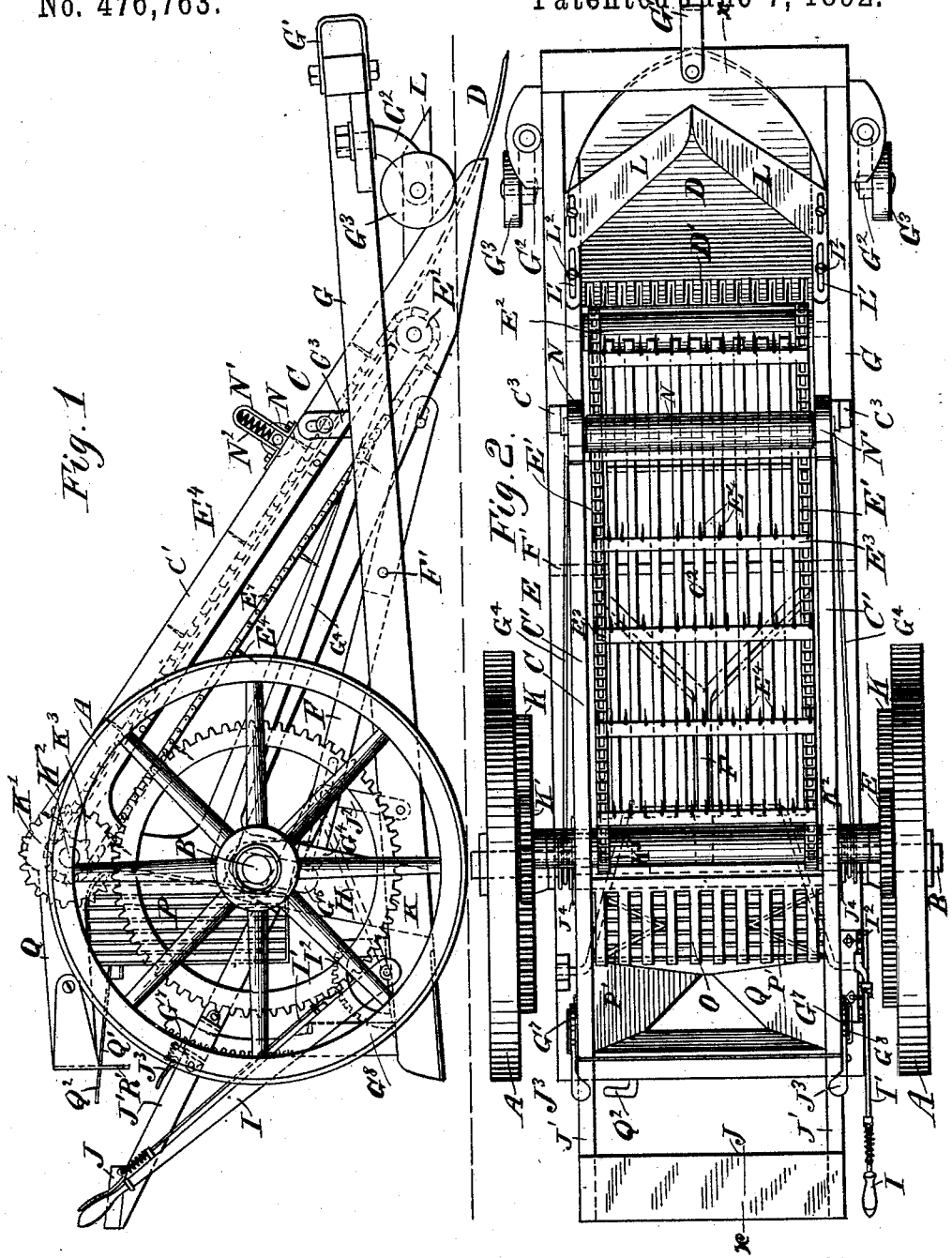
WITNESSES:
INVENTOR:
W. H. Van Voorhis
BY Munn & Co.
ATTORNEYS (No Model.) 2 Sheets—Sheet 2.
W. H. VAN VOORHIS.
POTATO DIGGER.
No. 476,763. Patented June 7, 1892.
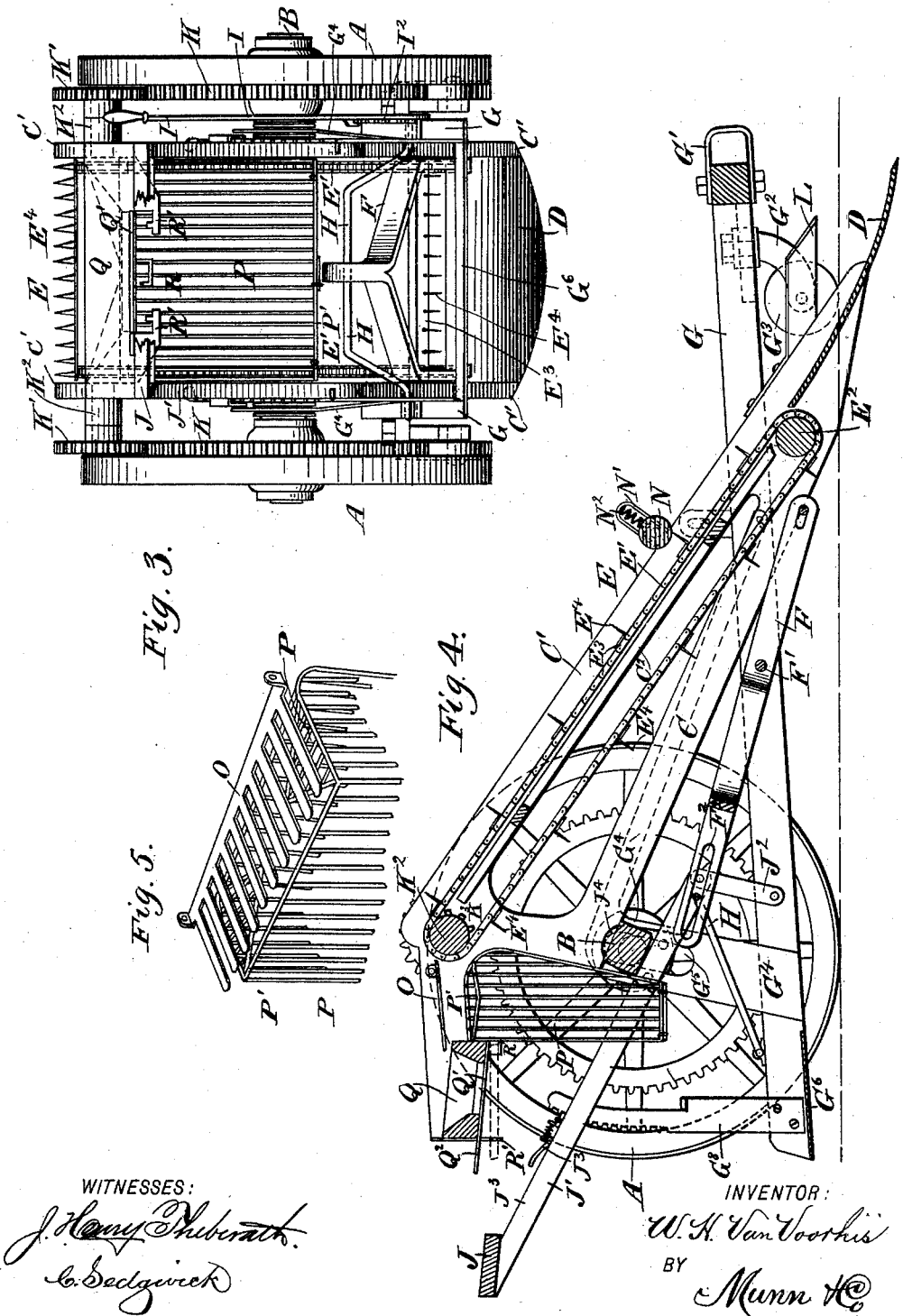
WITNESSES:
INVENTOR:
W. H. Van Voorhis
BY Munn & Co.
ATTORNEYS

UNITED STATES PATENT OFFICE.

WILLIAM H. VAN VOORHIS, OF SPEARVILLE, KANSAS, ASSIGNOR OF ONE-THIRD TO WALTER S. RITCHIE, OF ASPEN, COLORADO.

POTATO-DIGGER.

SPECIFICATION forming part of Letters Patent No. 476,763, dated June 7, 1892.

Application filed March 20, 1891. Serial No. 385,798. (No model.)

*To all whom it may concern:*

Be it known that I, WILLIAM H. VAN VOORHIS, of Spearville, in the county of Ford and State of Kansas, have invented a new and Improved Digger, of which the following is a full, clear, and exact description.

The object of the invention is to provide a new and improved digger which is simple and durable in construction, very effective in operation, designed for readily digging potatoes, peanuts, &c., out of the ground, separating the weeds in the ground from the potatoes, peanuts, and the like, and separating the small and large potatoes, peanuts, &c., the larger ones passing into a bag.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a plan view of the same. Fig. 3 is a rear end elevation of the same with parts broken out. Fig. 4 is a sectional side elevation of the same on the line $x\,x$ of Fig. 2, and Fig. 5 is a perspective view of the potato separator and receptacle for small potatoes.

The improved digger is provided with the two main wheels A, journaled loosely on the ends of the axle B, supporting rigidly the elevator-frame C, on the front end of which is secured the forwardly and downwardly extending plow D, adapted to pass into the ground to plow up the potatoes, peanuts, and the like. The potatoes plowed up by the plow D pass rearwardly on the latter and are delivered to an elevator E, designed to carry up the potatoes, peanuts, and the like in the manner hereinafter more fully described.

The front end of the elevator-frame C is pivotally connected with the front ends of a bifurcated lever F, fulcrumed by a rod F' to the draft-frame G, carrying at its front end the usual clevis G', to which the team is hitched in the usual manner. On the sides and near the front end of the draft-frame G are mounted to swing arms $G^2$, each carrying a wheel $G^3$, adapted to travel on top of the ground on the sides of the elevator-frame C and above the plow D. The rear end of the lever F is formed with a slot $F^2$, engaged by the middle part of a U-shaped lever H, the ends of which are formed with trunnions mounted to turn in suitable bearings on the rear of the draft-frame G.

On one of the trunnions of the lever H is secured a hand-lever I, extending upward and provided with a locking-lever I', adapted to engage a notched segment $I^2$, secured on the draft-frame G, and serving to lock the said lever I in place after the elevator-frame C and its plow D have been adjusted to the proper place, so that the said plow D passes the proper depth into the ground. The handle of the lever I extends within convenient reach of the operator seated on the seat J, located in the rear of the machine and supported on side bars J', pivoted on the axle B by upwardly-extending plates $J^4$, and pivotally connected at their forward ends by links $J^2$ with side arms of the draft-frame G. On each of the arms J' is formed a catch or locking-lever $J^3$, adapted to engage one of a series of teeth $G^7$, formed on a rack $G^8$, secured on the respective side beam of the draft-frame G and extending through keepers on the arms J'.

When the operator desires to raise or lower the plow D, he unlocks the locking-lever I' and then moves the lever I forward or backward, so that the lever H is swung up or down, and by its connection with the lever F imparts a swinging motion to the latter, so that the front end of this lever F swings up and down, and thereby imparts a swinging motion to the elevator-frame C, thus raising and lowering the plow D to force the latter to go the proper depth into the ground or to throw the said plow entirely out of the ground whenever desired—as, for instance, in turning from one row to another.

By adjusting the catches $J^3$ on the teeth $G^7$ of the racks $G^8$ the rear end of the draft-frame G is raised or lowered, so that the platform $G^6$ is moved up or down according to the size of the bag to be filled with the potatoes, as hereinafter more fully described. In order to steady the rear part of the draft-frame G, the latter is provided with upwardly and forwardly extending braces $G^4$, each formed with an elongated slot $G^5$, through which passes the axle.

The elevator E, previously mentioned, is actuated from the main driving-wheels A, each of which is provided for this purpose at its inner face with a gear-wheel K, meshing into a gear-wheel $K'$, secured on the outer end of a shaft $K^2$, mounted to turn in suitable bearings in the upper part of the elevator-frame C. The shaft $K^2$ is provided between the side beams $C'$ of the said elevator-frame C with sprocket-wheels $K^3$, over which pass the sprocket-chains $E'$, also passing over a roller $E^2$, journaled in the lower part of the elevator-frame C. (See Fig. 4.) The two sprocket-chains are connected with each other at suitable intervals by cross-beams $E^3$, each of which is provided with teeth or prongs $E^4$, which serve to carry the potatoes upward from the rear end of the plow D. The sprocket-chains and the cross-bars $E^3$ pass over longitudinally-extending slats $C^2$, supported on the side beams $C'$ of the elevator-frame C.

In order to bring the rear end of the plow D in close proximity to the bars $E^3$, the teeth or prongs $E^4$ pass through slots $D'$, formed in the rear end of the plow D, as is plainly shown in Fig. 2. The prongs $E^4$ in passing through the slots take up the potatoes and ground, &c., at the rear end of the plow D and carry the several parts upward and rearward, the ground meanwhile dropping between the slats $C^2$ back onto the field, while the potatoes are carried rearward to the upper end of the elevator E.

In order to prevent the weeds from passing onto the elevator, cutters or shears L are provided, held adjustably on the side beam $C'$ of the elevator-frame C and extending inward and toward each other over the plow D, as is plainly shown in Figs. 1 and 4. Each of the shears L has its inner end pointed and the outer edge sharpened, so as to readily cut the weeds on the forward movement of the machine. It is understood that the sharpened edge stands diagonally, the shear itself being slightly inclined, so that the weeds cut off are moved outwardly to the sides of the draft-frame G. Each of the shears or cutters L is provided on its outer end with a slot $L'$, through which passes a bolt $L^2$, screwing in the said beam of the elevator-frame C, so that the said shears can be adjusted forward or rearward, according to the nature of the weeds. It is understood that the pointed ends of the shears L are in close proximity to the ground, so as to cut off the stem of the weeds when the machine is passed forward.

In order to pulverize large clods passing with the potatoes up the elevator E, a roller N is provided, arranged transversely and journaled in suitable bearings $N'$ on top of the side beams $C'$ of the elevator-frame C. In the bearings $N'$ are arranged springs $N^2$, pressing on the ends of the roller N, so as to hold the same in a lowermost position, in order to bring the roller in contact with the clods, so as to crush the same when passing under the roller on their upward movement with the potatoes held by the prongs $E^4$ of the elevator E.

The elevator E is adapted to discharge the potatoes at the upper end onto a rearwardly and downwardly extending plate O, formed with prongs, between which smaller potatoes can pass downward onto V-shaped open deflecting-plates $P'$, held in the upper end of a receptacle P, arranged below the plate O and secured on the elevator-frame C, directly in the rear of the axle B. The potatoes passing over the deflecting-plates $P'$ are thrown onto the bars forming the sides of the open receptacle P, so that any dirt adhering to the potatoes or passing along with the same passes out between the bars of the receptacle P and drops to the ground. The larger potatoes not passing between the prongs of the plate O fall into a hopper Q, the opening of which is adapted to be closed by a pivoted bottom $Q'$, having a handle $Q^2$, extending rearwardly and under the control of the operator seated on the seat J.

On the under side of the hopper Q and at the front end is arranged a pin R, and two pins $R'$ are arranged on the rear end, the said three pins R and $R'$ serving to hold the mouth of a bag underneath the opening of the hopper Q, so that the potatoes from the latter can pass into the said bag. The lower end of the bag is adapted to rest on the platform $G^6$ of the draft-frame G, the said platform being raised or lowered, as is previously described, according to the size of the bag suspended from the pins R and $R'$. Stops $C^3$ are adjustably held to the sides of the frame C, which stops by contact with the frame G prevent the plow from entering too deeply into the ground.

The operation is as follows: When the machine is pulled forward over the ground, the plow D enters the ground and plows up the potatoes, the weeds of the latter being cut off by the cutters or shears L and moved to one side of the machine. The ground and potatoes pass upward and rearward on the plow D as the machine moves forward and are finally taken up by the first row of teeth or prongs E coming through the slots $D'$. The ground and potatoes, after passing over the roller $E^2$, pass onto the slats $C^2$, so that the potatoes are turned over and over, whereby the ground separates and falls through the slats onto the field. The potatoes are carried upward and are finally discharged from the elevator E onto the plate O, on which the potatoes are separated, the smaller ones passing through the prongs of the said plate into the receptacle P, while the larger ones pass into the hopper Q and when the bottom $Q'$ is open into the bag suspended underneath the said hopper on the pins R and $R'$. As soon as the bag is filled the operator moves the bottom $Q'$, so as to close the hopper Q to permit the potatoes to accumulate in the said hopper. The operator then unhooks the mouth of the bag from the pins R and R', ties the bag, and throws it off of the platform $G^6$ onto the field. A new bag is then hung onto the pins R and R', and then the bottom Q' is again opened, so that the potatoes pass from the hopper Q into the new bag to fill the same.

The elevator E is actuated on a forward motion of the machine by the gear-wheels K, revolving with the main driving-wheels A, the said gear-wheels imparting a rotary motion to the gear-wheels K', and consequently to the shaft $K^2$, so that the sprocket-wheels $K^3$ impart a traveling motion to the chains E' of the said elevator. The gear-wheels K' may be so arranged as to be readily thrown out of gear with the gear-wheels K to stop the elevator E when the machine is being turned around at the end of the row.

Having thus fully described my invention, I claim as new and desire to secure by Letters Patent—

1. In a digger, the combination, with an axle and the drive-wheels thereon, of an elevator-frame rigidly connected to the axle, a draft-frame loosely suspended from the axle, a lever pivoted to the elevator-frame, a hand-lever pivoted to the draft-frame, and a connection between the hand-lever and the lever pivoted to the elevator-frame, substantially as described.

2. In a digger, the combination, with an axle and the drive-wheels thereon, of an elevator-frame rigidly connected to the axle, a draft-frame loosely suspended from the axle, a bifurcated lever pivoted to the elevator-frame and having its rear end slotted, a U-shaped lever pivoted to the draft-frame and engaging the slot of the bifurcated lever, and a hand-lever secured to one of the trunnions of the U-shaped lever, substantially as herein shown and described.

3. In a digger, the combination, with the axle and a draft-frame suspended therefrom, of seat-bars pivotally connected with the axle, links connecting the lower ends of the seat-bars with the draft-frame, racks projecting upward from the draft-frame, and catches on the seat-bars and engaging the said racks, substantially as described.

4. In a digger, the combination, with a plow and an elevator on which the plow discharges, of a plate arranged on the discharge end of the elevator and formed with prongs and an open receptacle below the said plate and provided with deflecting-plates in its top for deflecting the potatoes against the sides of the receptacle, substantially as and for the purpose set forth.

5. In a digger, the combination, with a plow and an elevator on which the plow discharges, of a plate at the discharge end of the elevator, provided with prongs, an open receptacle below the said plate and provided with V-shaped open deflecting-plates, and a hopper at the rear of the prongs, substantially as herein shown and described.

6. In a digger, the combination, with a plow and an elevator on which discharges the said plow, of a plate arranged on the discharge end of the said elevator and formed with prongs, an open receptacle arranged underneath the said plate to receive the potatoes passing between the prongs and provided with deflectors for deflecting the potatoes against the sides of the receptacle, a hopper arranged at the rear end of the said prongs to receive the larger potatoes rolling over the prongs, and means, substantially as described, for supporting the mouth of a bag underneath the said hopper, substantially as set forth.

7. In a digger, the combination, with a plow and an elevator on which discharges the said plow, of a plate arranged on the discharge end of the said elevator and formed with prongs, an open receptacle arranged underneath the said plate to receive the potatoes passing between the prongs and provided with deflectors for deflecting the potatoes against the sides of the receptacle, a hopper arranged at the rear end of the said prongs to receive the larger potatoes rolling over the prongs, means, substantially as described, for supporting the mouth of a bag underneath the said hopper, and a bottom hinged on the under side of the said hopper to close the bottom opening therein, substantially as shown and described.

8. In a digger, the combination, with an elevator provided with chains mounted to travel and having cross-bars formed with teeth or prongs, of a spring-pressed roller arranged over the said prongs and serving to crush clods carried forward by the said prongs, substantially as shown and described.

WILLIAM H. VAN VOORHIS.

Witnesses:
 EDGAR STALLARD,
 J. D. BRANSFORD.